United States Patent
Yokouchi et al.

(10) Patent No.: US 7,124,984 B2
(45) Date of Patent: Oct. 24, 2006

(54) STAND FOR DISPLAY MONITOR

(75) Inventors: Koji Yokouchi, Kanagawa (JP); Takurou Kamizuru, Kanagawa (JP)

(73) Assignees: Shin-Ei Sangyo Co., Ltd., Kanagawa (JP); Sotec Co., Ltd., Kanagawa (JP)

( * ) Notice: Subject to any disclaimer, the term of this patent is extended or adjusted under 35 U.S.C. 154(b) by 24 days.

(21) Appl. No.: 11/018,437

(22) Filed: Dec. 21, 2004

(65) Prior Publication Data
US 2005/0205725 A1    Sep. 22, 2005

(30) Foreign Application Priority Data
Dec. 24, 2003   (JP)   ............................ 2003-426944

(51) Int. Cl.
  *F16M 13/00*   (2006.01)
  *G06F 1/16*    (2006.01)
(52) U.S. Cl. ................ 248/125.8; 248/125.9; 248/276.1; 361/681
(58) Field of Classification Search ............ 248/124.1, 248/125.8, 133, 370, 371, 274.1, 276.1, 292.12, 248/295.11, 917, 919, 923, 125.9; 361/681, 361/682, 683, 678
See application file for complete search history.

(56) References Cited

U.S. PATENT DOCUMENTS 5,262,762 A * 11/1993 Westover et al. ........... 345/168
5,715,138 A * 2/1998 Choi .......................... 361/681
D418,831 S * 1/2000 Rosen et al. ................ D14/376
6,381,125 B1* 4/2002 Mizoguchi et al. ......... 361/682
6,392,877 B1* 5/2002 Iredale ....................... 361/683
6,874,743 B1* 4/2005 Watanabe et al. ......... 248/276.1
2003/0075649 A1* 4/2003 Jeong et al. ................ 248/157
2004/0256523 A1* 12/2004 Jeong et al. ............. 248/125.9

FOREIGN PATENT DOCUMENTS

JP    11-338576    12/1999

* cited by examiner

Primary Examiner—Amy J. Sterling
Assistant Examiner—Tan Le
(74) Attorney, Agent, or Firm—Notaro & Michalos P.C.

(57) ABSTRACT

In order to provide a stand for a display monitor capable of preventing the occurrence of abnormal noise when the stand moves upward and downward and capable of being intended to be thinner in thickness by exercising ingenuity especially in a raising and lowering mechanism, the stand is composed of a base member attached to a pedestal portion; a case body erected on the base member; a raising and lowering plate inserted in the case body so that the plate can slide in upward and downward directions; a bracket to which a display monitor is attached, installed on an upper side of the raising and lowering plate via a tilt mechanism; a rack member attached to the raising and lowering plate; and a torque limiter having a driving pinion gear engaged with the rack member, which is fixed to the case body and generates a rotation torque when rotating in one direction.

6 Claims, 4 Drawing Sheets

STAND FOR DISPLAY MONITOR

BACKGROUND OF THE INVENTION

1. Field of the Invention

The present invention relates to a stand for a display monitor suitable for use in display monitors such as a notebook personal computer, a liquid-crystal display monitor or a thin type monitor placed on a table, and the like.

2. Description of the Related Art

Conventionally, as a stand for adjusting the height and the angle of a display monitor placed on a table, various kinds of stands for the display monitor such as shown in Japanese Utility Model Registration No. 3063920 or Japanese Patent Application Laid-open No. Hei 11-338576 are known.

In the stands for the display monitor shown in these patent documents, a raising and lowering mechanism adjusting the height of the monitor is the one combining a friction mechanism with a elastic means composed of a compression spring, an extension spring and a constant spring in both cases.

In the stand for the display monitor (hereinafter, it is also referred to as a stand) including the raising and lowering mechanism constituted by the combination of the friction mechanism and the elastic means, the abnormal noise is apt to occur on the occasion of a stretching movement of the elastic means and on the occasions of a friction in the friction mechanism, and further, it is difficult to decrease the thickness of the stand itself due to a spring characteristic of the elastic means, as a result, there exist limitations for constructing the stand to be compact and smart.

SUMMARY OF THE INVENTION

An object of the present invention is to provide a stand for a display monitor capable of preventing the occurrence of abnormal noise when the display monitor moves upward and downward and capable of being intended to be thinner in thickness by exercising ingenuity especially in a raising and lowering mechanism.

In order to achieve the object described above, the present invention is characterized by being composed of a base member attached to a pedestal portion; a case body erected on the base member; a raising and lowering plate inserted in the case body so that the plate can slide in upward and downward directions; a bracket to which a display monitor is attached, installed on an upper side of the raising and lowering plate via a tilt mechanism; a rack member attached to the raising and lowering plate; and a torque limiter having a driving pinion gear engaged with the rack member, which is fixed to the case body and generates a rotation torque when rotating in one direction.

According to the present invention described above, the case body can be swingably installed in front and back directions with respect to the base member via the tilt mechanism.

Besides, according to the present invention, the bracket can be attached to the raising and lowering plate via the tilt mechanism.

Additionally, according to the present invention, the driving pinion gear and the rack member can be made of synthetic resin.

Furthermore, according to the present invention, slide members can be fixed at both sides of the raising and lowering plate.

According to the present invention, the rack member can be fitted along one side of a guide hole stretching in the upward and downward directions, provided at the central part of the raising and lowering plate.

DETAILED DESCRIPTION OF THE PREFERRED EMBODIMENTS

Figure 4:
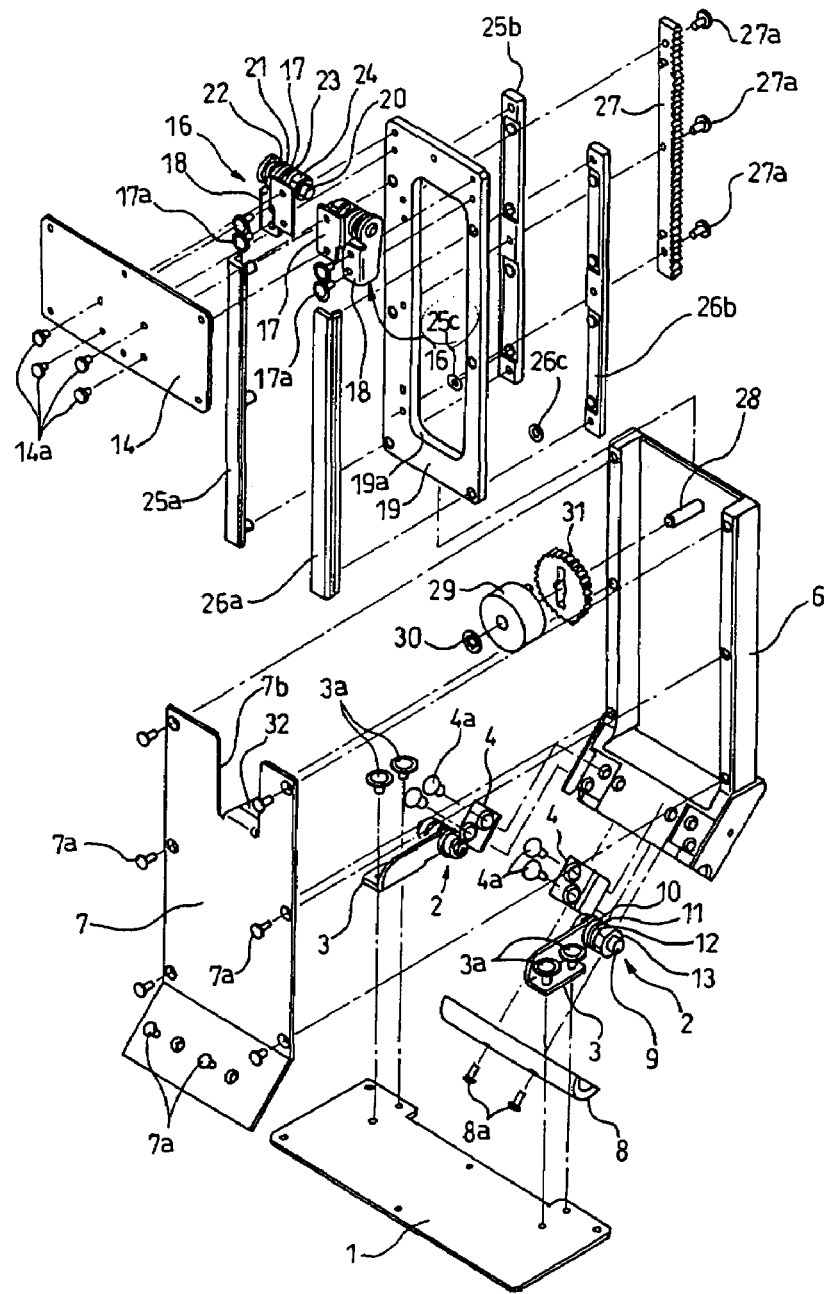
FIG. 4 is an exploded perspective view of the stand for the display monitor shown in FIG. 1.

The drawings show one embodiment of the present invention. An article shown with reference numeral 1 denotes a base member, which is attached to a pedestal portion A shown by an imaginary line in FIG. 1. Respective attachment members 3, 3 of a pair of first tilt mechanisms 2, 2 having a known structure is fixed to the base member 1 by means of attachment screws 3a, 3a. . . at a certain interval. Especially, as shown in FIG. 4, both lower side portions of a case body 6 in a supporting case 5 of a raising and lowering mechanism B are attached to respective brackets 4, 4 of the first tilt mechanisms 2, 2 by means of attachment screws 4a, 4a. . . . The case body 6 is a molded article made of synthetic resin. A front lid 7 and a lower lid 8 are fitted to the case body 6 by corresponding attachment screws 7a, 7a. . . and 8a, 8a. . . respectively at the front side and at the lower side. The first tilt mechanisms 2, 2 are the mechanisms having a known structure being composed of a shaft 9, one or a plurality of friction washers 10, similarly, one or a plurality of spring washers 11, a presser washer 12, and a clamping nut 13, besides the attachment members 3, 3 and the brackets 4, 4. These mechanisms may have a structure such that a required torque is obtained by crimping an end portion of the shaft 9, instead of using the clamping nut 13. In addition, the sides to which the clamping nuts 13 in the tilt mechanisms 2, 2 are provided can be housed inside the case body 6.

Figure 1:
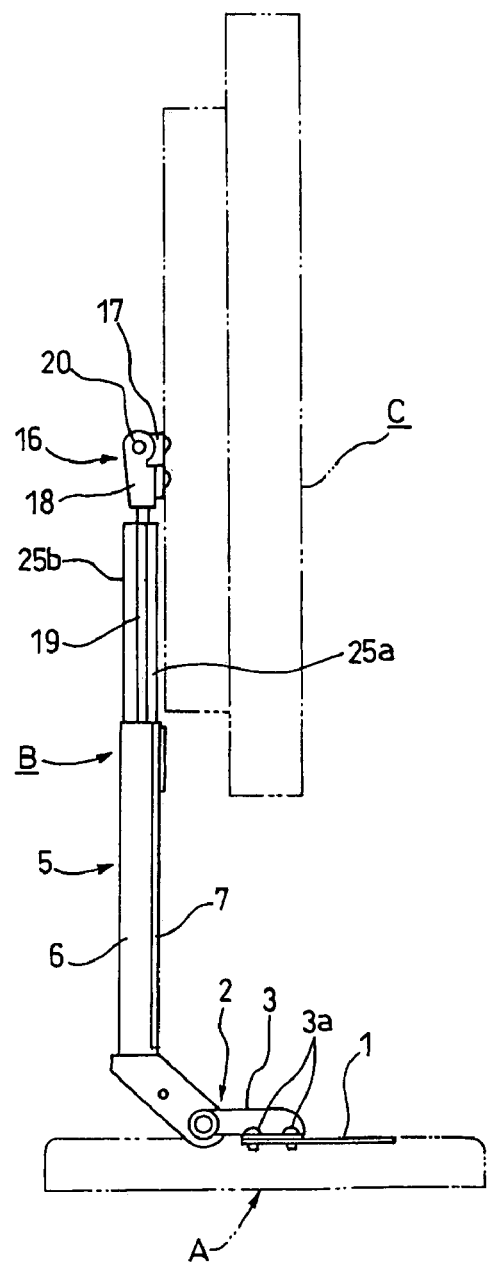
FIG. 1 is a perspective view of a stand for a display monitor according to the present invention.
Figure 2:
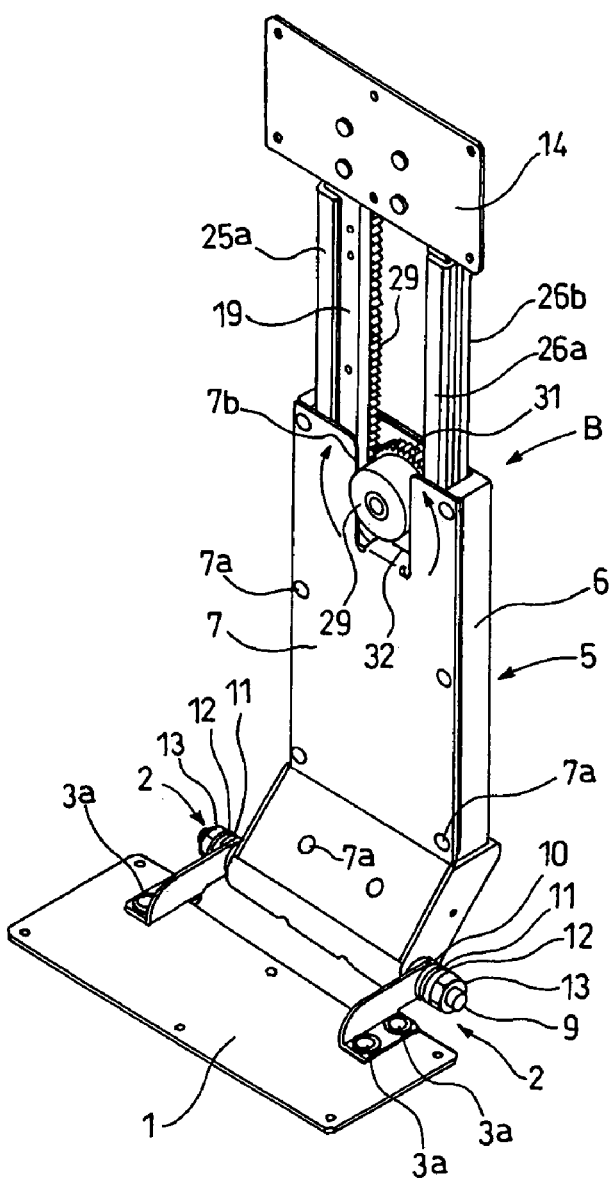
FIG. 2 is a side view of the stand for the display monitor shown in FIG. 1 when mounted.
Figure 3:
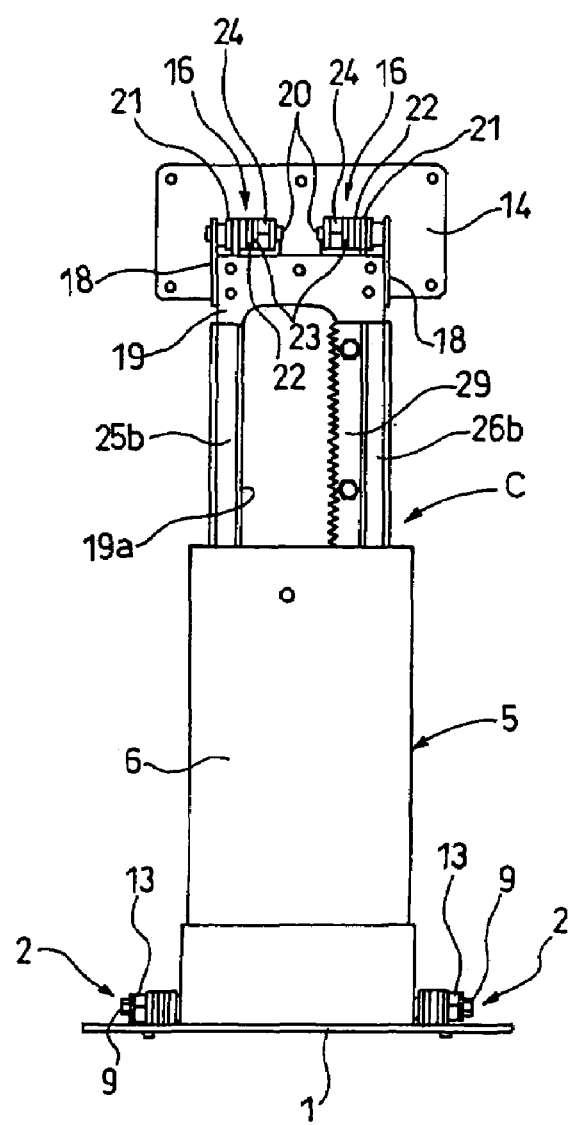
FIG. 3 is a rear view of the stand for the display monitor shown in FIG. 1.

An article shown with reference numeral 14 denotes a bracket for a monitor to which a display monitor C shown by an imaginary line in FIG. 1 is installed. Both lower end portions of the bracket for the monitor 14 is fixed to respective brackets 17, 17 of a pair of second tilt mechanisms 16, 16 by attachment screws 14a, 14a. . . . Attachment members 18, 18 of the second tilt mechanisms 16, 16 are fixed to both upper end portions of a raising and lowering plate 19 inserted inside the supporting case 5 so that the plate can slide in upward and downward directions by attachment screws 17a, 17a . . . .

The second tilt mechanisms 16, 16 has the same structure as the first tilt mechanism 2, and the structure is known as one being composed of a shaft 20, one or a plurality of friction washers 21, similarly one or a plurality of spring washers 22, a presser washer 23, and a clamping nut 24, besides and the brackets 17, 17 and attachment members 18, 18. An end portion of the shaft 20 may be crimped so that a required torque is obtained, instead of using the clamping nut 24.

A guide hole 19a is formed at the raising and lowering plate 19 by boring the central part thereof vertically upward and downward. Slide members 25a, 25b/25a, 25b are attached at both end portions of both sides of the raising and lowering plate 19 and the whole raising and lowering plate 19 is inserted inside the supporting case 5 so that the plate can slide in upward and downward directions. Furthermore, a rack member 27 made of synthetic resin, for example, POM (polyacetal) and the like is attached to the raising and lowering plate 19 along the guide hole 19a by attachment screws 27a, 27a. . . . In addition, articles shown with reference numerals 25c, 26c denote wave washers which have a function of adjusting the operating force of sliding of the raising and lowering plate 19.

A supporting shaft 28 is protrudingly provided inside the case body 6 of the supporting case 5 and a torque limiter 29 is locked to the supporting shaft 28. The torque limiter 29 having a structure such that a torque is generated only when it rotates in one direction is locked to the supporting shaft 28 so as not to be slipped therefrom by means of a CS snap ring or an E type ring 30. And the rotation of the torque limiter 29 is controlled by being fitted to a cutout portion 7a provided at the front lid 7. It should be noted that the torque limiter 29 can be fixed to the supporting case 5 by other means, not by the cutout portion 7a or the supporting shaft 28.

A driving pinion gear 31 made of synthetic resin such as POM and the like is attached to the rotating portion of the torque limiter 29 and the driving pinion gear 31 engages with the rack member 27. An article provided with the front lid 7 folded inside from the cutout portion 7b is a stopper member 32. An end portion of the stopper member 32 is fitted into the guide hole 19a provided at the raising and lowering plate 19.

Therefore, an angle adjustment in front and back directions of the display monitor C attached to the stand for the display monitor according to the present invention can be performed arbitrarily by means of the first and second tilt mechanisms 2, 2/16, 16, and an height adjustment is performed by the raising and lowering plate 19 slid in the upward and downward directions with respect to the supporting case 5. At that time, the movement of the display monitor C in the upward direction is made with the driving pinion gear 31 rotating on the rack member 27 since the rotation torque is not generated at the torque limiter 29. When the display monitor C moves in the downward direction, the driving pinion gear 31 which rotates being guided by the rack member 27 receives a load by the rotation torque generated by the torque limiter 29, so that the display monitor C moves downward against the rotation torque of the torque limiter 29 and stops arbitrarily at the place where hands are taken off to be able to keep a stable condition.

Additionally, when the display monitor C moves upward and downward, the rack member 27 and the driving pinion gear 31 which are both made of synthetic resin engage each other, so that the abnormal noise can hardly occur and the stand moves smoothly without a hitch. Note that either the rack member 27 or the driving pinion gear 31 can be made of metal.

As can be seen from the above detail description, the stand has the wide versatility as the stand adaptable for various kinds of display monitors since it has thin and smart appearance and the abnormal noise hardly occur.

What is claimed is:

1. A stand for a display monitor comprising:
   a base member attached to a pedestal portion;
   a case body erected on said base member;
   a raising and lowering plate having slide members attached to both sides of the raising and lowering plate and inserted in said case body so that said plate can slide in upward and downward directions by said slide members;
   a bracket to which a display monitor is attached, installed on an upper side of said raising and lowering plate via a tilt mechanism;
   a rack member attached to said raising and lowering plate; and
   a torque limiter having a driving pinion gear engaged with said rack member, which is fixed to said case body and generates a rotation torque when rotating in one direction;
   wherein said raising and lowering plate having a guide hole is formed at a central part thereof vertically upward and downward, said rack member attached to one side portion of said guide hole, and one of said torque limiter and said driving pinion passed through said guide hole.

2. The stand for the display monitor according to claim 1, wherein said case body is swingably installed in front and back directions with respect to said member via the tilt mechanism.

3. The stand for the display monitor according to claim 1, wherein said bracket is attached to said raising and lowering plate via the tilt mechanism.

4. The stand for the display monitor according to claim 1 wherein one or both of said driving pinion gear and said rack member is/are made of synthetic resin.

5. The stand for the display monitor according to claim 1 to wherein said slide members constitute of each pair of members attached to said both side portions of said raising and lowering plate from front and rear direction.

6. The stand for the display monitor according to claim 1, wherein said case body having a stopper regulate a sliding motion of upward and downward direction of said raising and lowering plate by engaging with said guide hole.

* * * * *